United States Patent [19]
Kwon et al.

[11] Patent Number: 5,475,506
[45] Date of Patent: Dec. 12, 1995

[54] PHOTOGRAPHIC COLOR PRINTER

[75] Inventors: Heemin Kwon, Pittsford; Patrick A. Cosgrove, Honeoye Falls; Kenneth A. Carlson; Mark S. Leader, both of Rochester, all of N.Y.

[73] Assignee: Eastman Kodak Company, Rochester, N.Y.

[21] Appl. No.: 130,072

[22] Filed: Sep. 30, 1993

[51] Int. Cl.⁶ .................................................. H04N 1/46
[52] U.S. Cl. ........................... 358/500; 358/512; 355/32
[58] Field of Search ................................. 358/500, 501, 358/505, 512, 515, 506, 487; 355/32, 35, 38

[56] References Cited

U.S. PATENT DOCUMENTS

| | | | |
|---|---|---|---|
| 4,050,807 | 9/1977 | Barbieri | 355/32 |
| 4,589,766 | 5/1986 | Fursich et al. | 355/38 |
| 5,043,771 | 8/1991 | Shibata et al. | 355/208 |

FOREIGN PATENT DOCUMENTS

| | | | |
|---|---|---|---|
| 0150145 | 7/1985 | European Pat. Off. | 358/500 |

OTHER PUBLICATIONS

*Objectives and Methods of Density Measurement in Sensitometry of Color Films* by Franklin C. Williams, Feb. 1950, pp. 104–112.

*The Influence of Film, Paper, and Printer Spectral Characteristics on Photofinishing Performance* by W. C. Kress and P. J. Alessi, Apr. 1983, pp. 58–62.

*Primary Examiner*—Scott A. Rogers
*Assistant Examiner*—Thomas D. Lee
*Attorney, Agent, or Firm*—Thomas H. Close

[57] ABSTRACT

In a color photographic printer of the type having a film scanner having a 50% green spectral response between 522±5 nm and 570±2.5 nm and peaking at 550 nm, a lowpass cutoff filter for lowering the upper cutoff wavelength of the green channel response is added to the green channel to improve the color correction of the printer for all color films presently in use.

6 Claims, 2 Drawing Sheets

PHOTOGRAPHIC COLOR PRINTER

FIELD OF THE INVENTION

The invention relates to photographic color printers, and more particularly to such color printers having a scanner for scanning negative color originals and determining the amount of exposure required in each of the primary colors during printing.

BACKGROUND OF THE INVENTION

It is well known in photographic color printers to employ a scanning system to scan a photographic negative to determine the amount of exposure required in each of three primary colors for printing the photographic negative onto photographic color paper. U.S. Pat. No. 4,589,766 issued May 20, 1986 to Fursich et al discloses a color copier having such a scanning system and teaches that if the spectral sensitivities of the measuring system and the copying system are exactly matched, the type of photosensitive material or film being printed in the copier is of no consequence. A copying system as used herein means a given photographic paper exposed by a given printer lamp. Thus, theoretically, if the spectral sensitivities of the color channels in the scanner exactly match the spectral sensitivities of the color photographic paper in the photographic printer, the exposure in the printer can be controlled so as to obtain properly colored copies independently of the type of dye or density of the masks used in making the film.

Although in theory this may be correct, in practice it has not proven to be feasible to achieve a wavelength by wavelength match between the spectral response of the scanning system and the spectral response of the photographic paper in a color photographic printer. This has been due to the difficulty and expense of designing color filters and light source combinations for the scanner that exactly match the spectral sensitivity of the photographic paper at all wavelengths. For example, a line of photographic printers of the type described in U.S. Pat. No. 4,589,766 is manufactured and sold by the AGFA corporation as the MSP and MSC printers. The MSP and MSC printers are designed to be used with all kinds of film without the need to readjust the printer for film type. FIG. 3 shows a measured spectral response of the scanner in an AGFA MSP printer with filters designed to be used with Kodak color photographic paper versus a typical spectral response of the Kodak color photographic paper when exposed by the MSP printer lamp. The curves labeled 10, 12, and 14 are the measured spectral response curves of the blue, green and red channels of the scanner respectfully. The curves labeled 16, 18, and 20 are the measured spectral response curves of the blue, green and red sensitive layers of a color photographic paper, respectively. As can be seen from FIG. 3, the spectral responses of the scanner in the MSP photographic printer are an approximation of the spectral responses of the photographic paper in the printer.

Although the scanner filters and light source employed in the scanner of the AGFA MSP printer were chosen to provide a reasonably approximate match of the particular color photographic paper, it was found that all films could not be printed with consistent color as a function of negative exposure level. When the printer was balanced to print any one of the films throughout the exposure scale to the same color balance, other films experienced a color bias on the order of 0.10 reflection print density units. For example, if the printer were to be set up to yield standard color prints from AGFA 100 brand color negative film, Kodacolor VR 200 brand film would experience a green color bias for high density negatives on the order of 0.10 density units. Conversely, if the printer were to be set up to print Kodacolor VR 200 brand film, the AGFA 100 brand film would print with magenta bias on the order of 0.10 density units.

It is therefore the object of the present invention to provide an improved color scanner for a color photographic printer of the type having a spectral response like that shown in FIG. 3 that overcomes the problems noted above.

SUMMARY OF THE INVENTION

The object is achieved according to the present invention by providing a cutoff filter having a 50% transmission point at between 555 and 565 nm and preferably 562 nm in the green channel of the scanner, thereby reducing the longer wavelength side of the green spectral response of the scanner by between 5 and 15 nm and preferably 8 nm.

DETAILED DESCRIPTION OF THE INVENTION

Figure 2:
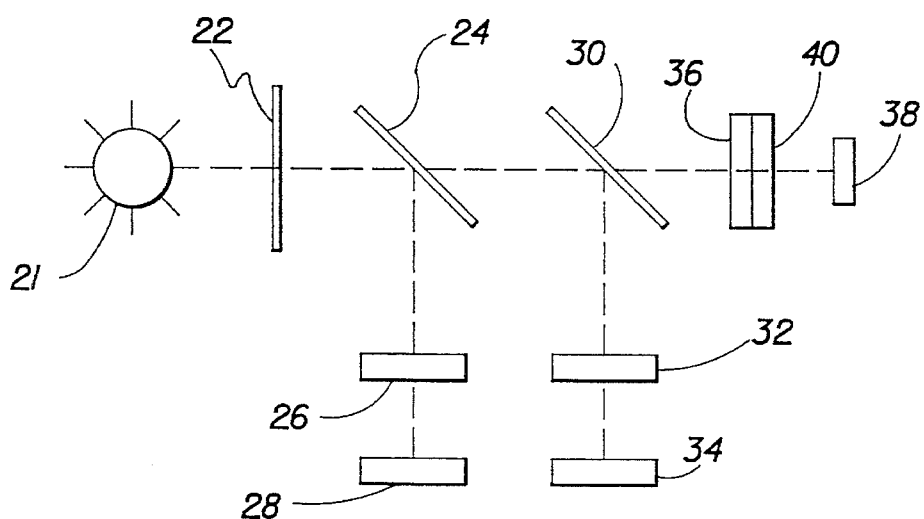
FIG. 2 is a schematic diagram illustrating the color scanner according to the present invention.
Figure 3:
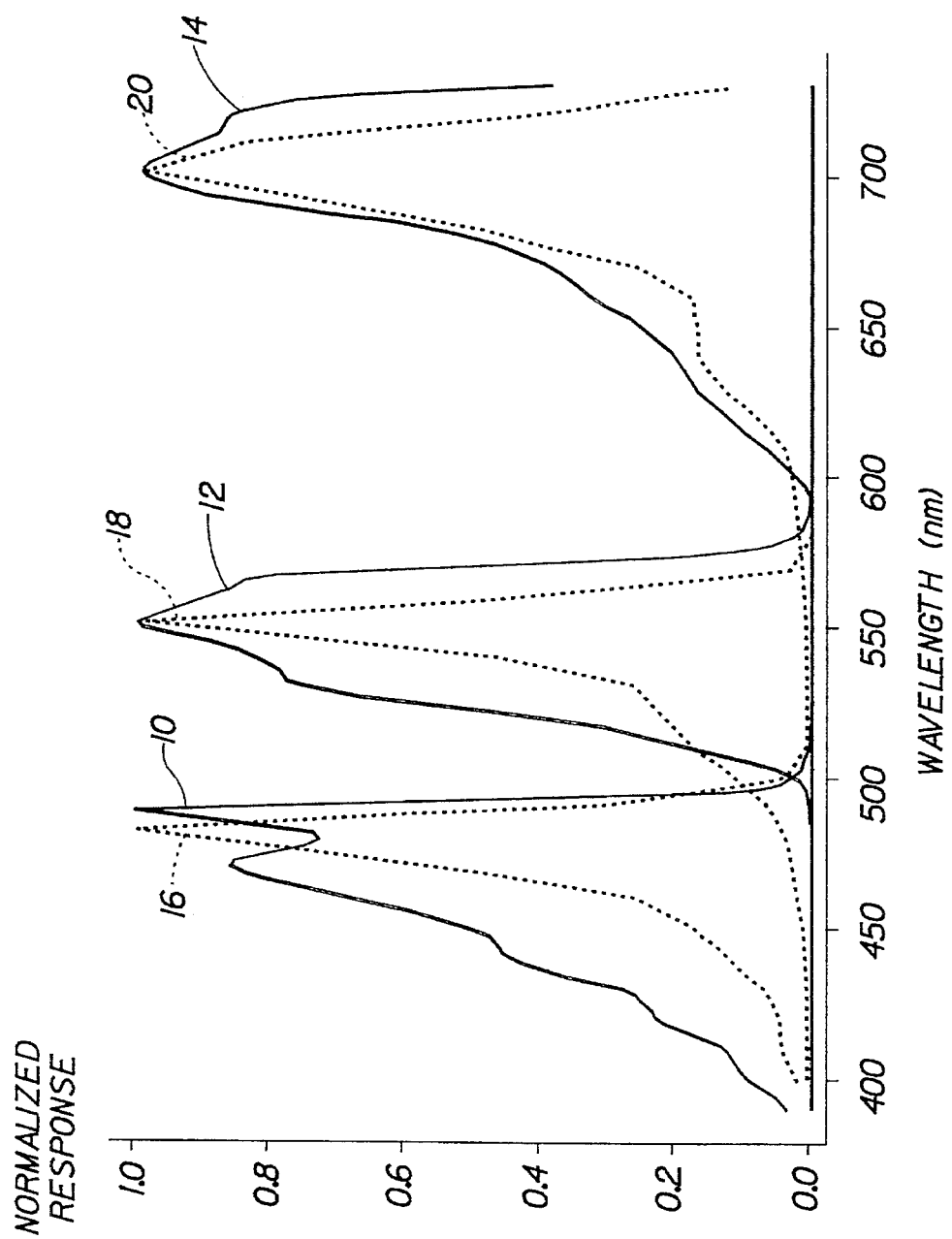
FIG. 3 is a plot showing the spectral response of the prior art scanner versus the spectral response of a typical color photographic paper in the printer.

Referring now to FIG. 2, a film scanning apparatus in a color printer is shown schematically. The film scanning apparatus includes a light source 21, which illuminates a photographic film 22. A beam splitter 24 directs a portion of the light transmitted through the film 22 to a first color filter 26 (e.g. the blue filter) to a first light measuring device 28. A second beam splitter 30 directs a portion of the light transmitted throughout the film 22 to a second color filter 32 (e.g. the red filter) to a second light measuring device 34. The remaining portion of light transmitted through the film is directed through a third color filter 36 (e.g. the green filter) to a third light measuring device 38. The spectral response of the green channel of the scanning apparatus is shown as curve 12 in FIG. 3. As shown in FIG. 3, the 50% response of the green channel is 522 nm in the short wavelength region and 570 nm in the long wavelength region and peaks at about 550 nm. The manufacturing variability for the spectral response of the green channel of the scanner is estimated to be ±2.5 nm in the long wavelength region and ±5 nm in the short wavelength region.

Figure 1:
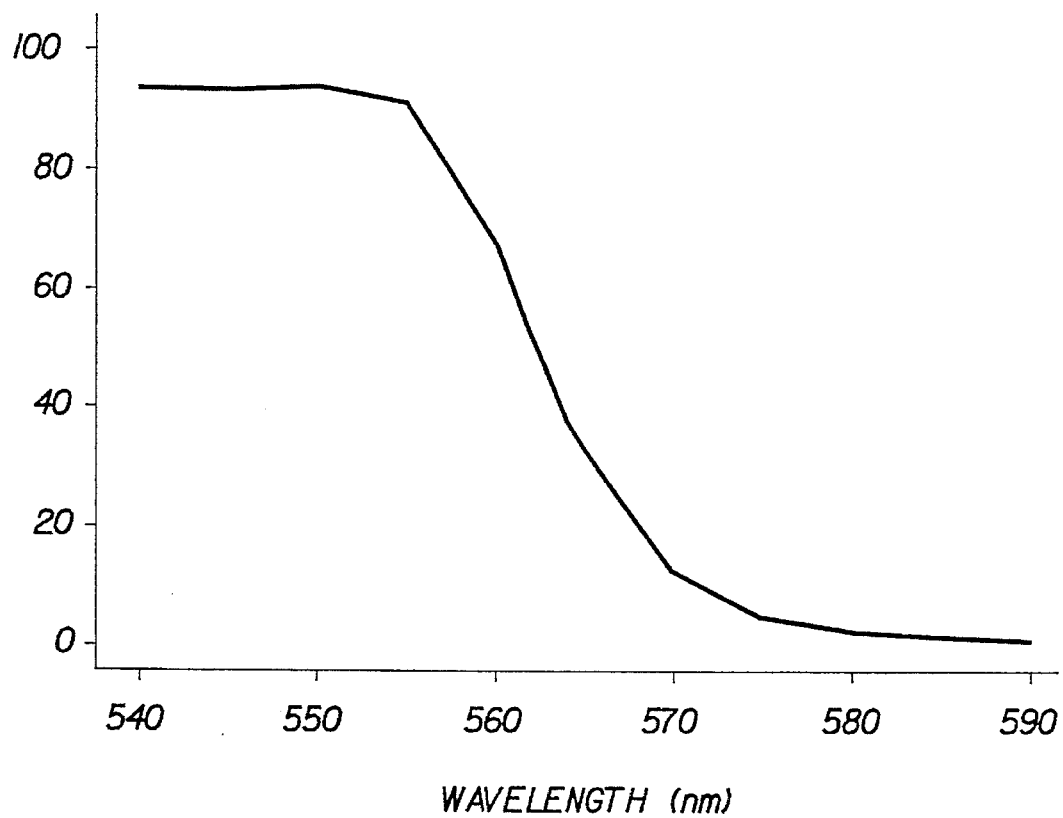
FIG. 1 is a plot showing the spectral transmission of a cutoff filter for use in the green channel of a scanner according to the present invention.

According to the present invention, a low pass cutoff filter 40 (see FIG. 2) having a 50% transmittance at between 555 and 565 nm and preferably 562 nm is placed in the green channel of the scanner. The spectral characteristics of the low Bass cutoff filter are shown in FIG. 1.

The low pass cutoff filter 40 can be, for example, a multilayer dichroic filter constructed according to known processes. The low pass cutoff filter may be formed on a separate substrate and physically located adjacent filter 36 in a filter holder (not shown) in the scanner. Preferably, the cutoff filter 40 is bonded to the filter 36 with optical cement to minimize transmittance loss at the interface between the two filters. Alternatively, the cutoff filter 40 may be integrally formed on the surface of filter 36 using known dichroic filter deposition techniques.

Experimental Results 1. (Comparative Example) An AGFA MSP printer having the scanner response shown in FIG. 3, balanced to print a reference exposure patch to reference print density and having a nominal slope response as specified by the manufacturer was employed to produce a first series of exposures. Negatives of a variety of film types exposed to different color biases (e.g. green, magenta, sky, tungsten and neutral grey) in a series of increasing density levels were prepared. The prepared negatives were printed in an AGFA MSP printer having a scanner filter set designed for Kodak color paper on Kodak color photographic paper. The prints were developed and status A reflection print density values were measured for the developed prints.

Color shifts on the order of 0.10 reflection print density units in the green direction were observed for the higher density prints from Kodak Kodacolor VR 200 brand color negative film.

2. (The Invention) A 562 nm lowpass cutoff filter was placed in the green channel of the scanner of the MSP printer according to the present invention and a second series of exposures were made. The color correction for the films exhibiting undesirable color shifts in the first series of exposures were measurably improved, while the color correction for the other films was not adversely affected.

Although the invention has been described as adding a cutoff filter at the green color filter location in the scanner, it will be appreciated by those skilled in the art that an equivalent effect can be achieved by modifying the green filter 36, the beam splitter 30, or the response of the sensor 38, or any combination thereof to lower the upper cutoff wavelength of the green channel by between 5 and 15 nm.

While the invention has been particularly shown and described with reference to a preferred embodiment thereof, it will be understood by those skilled in the art that various other changes in the form and details may be made therein without departing from the spirit and scope of the invention.

| PARTS LIST | |
|---|---|
| 21 | LIGHT SOURCE |
| 22 | PHOTOGRAPHIC FILM |
| 24 | BEAM SPLITTER |
| 26 | COLOR FILTER |
| 28 | MEASURING DEVICE |
| 30 | BEAM SPLITTER |
| 32 | COLOR FILTER |
| 34 | MEASURING DEVICE |
| 36 | COLOR FILTER |
| 38 | MEASURING DEVICE |
| 40 | CUTOFF FILTER |

We claim:

1. In a photographic color printer of the type having a film scanner having a green channel with a 50% spectral response of 522±5 nm and 570±2.5 nm and a peak response of 550 nm, the improvement comprising: a lowpass cutoff filter in the green channel of the film scanner having a cutoff wavelength of between 555 and 565 nm.

2. The photographic color printer claimed in claim 1, wherein said lowpass cutoff filter is a dichroic filter having a 50% transmission at 562 nm.

3. In a photographic color printer of the type having a film scanner having a green channel with a 50% spectral response of 522±5 nm and 570±2.5 nm and a peak response of 550 nm, the improvement comprising: means for lowering the upper cutoff wavelength of the green channel by between 5 and 15 nm.

4. The photographic color printer claimed in claim 3, wherein said means for lowering the 50% response of the green channel is a dichroic filter designed to lower the 50% response by 8 nm.

5. A method of modifying a photographic color printer of the type having a film scanner having a green channel with a 50% spectral response of 522±5 nm and 570± 2.5 nm and a peak response of 550 nm, comprising the step of: inserting a low pass cutoff filter having a cutoff wavelength of between 555 nm and 565 nm in the green channel of the film scanner.

6. The method claimed in claim 5, wherein the lowpass cutoff filter is a dichroic filter having a cutoff wavelength of 562 nm.

\* \* \* \* \*